US012081708B2

(12) United States Patent
Okada

(10) Patent No.: US 12,081,708 B2
(45) Date of Patent: Sep. 3, 2024

(54) PRINTING SYSTEM, PRINTING APPARATUS, INSPECTION APPARATUS, CONTROL METHOD THEREOF, AND STORAGE MEDIUM

(71) Applicant: CANON KABUSHIKI KAISHA, Tokyo (JP)

(72) Inventor: Hideyuki Okada, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/953,482

(22) Filed: Sep. 27, 2022

(65) Prior Publication Data

US 2023/0100681 A1 Mar. 30, 2023

(30) Foreign Application Priority Data

Sep. 29, 2021 (JP) ................................ 2021-159719

(51) Int. Cl.
*H04N 1/00* (2006.01)
*G06F 3/12* (2006.01)
*G06K 15/02* (2006.01)

(52) U.S. Cl.
CPC ..... *H04N 1/00477* (2013.01); *H04N 1/00005* (2013.01); *H04N 1/00029* (2013.01); *H04N 1/00076* (2013.01); *H04N 1/00482* (2013.01)

(58) Field of Classification Search
None
See application file for complete search history.

(56) References Cited

U.S. PATENT DOCUMENTS 9,288,360 B1* 3/2016 Dennison ........... H04N 1/00058
2004/0130748 A1* 7/2004 Hashimoto ........... G06F 3/1234 358/1.15
2005/0270550 A1* 12/2005 Sumio .................. G06F 3/1285 358/1.13
(Continued)

FOREIGN PATENT DOCUMENTS

JP 2006297739 A 11/2006
JP 2007041505 A 2/2007
(Continued)

*Primary Examiner* — Beniyam Menberu
(74) *Attorney, Agent, or Firm* — ROSSI, KIMMS & McDOWELL LLP

(57) ABSTRACT

The present invention provides an in-line printing system including a printing apparatus and an inspection apparatus for inspecting a product outputted by the printing apparatus. In addition, the printing apparatus sequentially assigns page information to each page of the product outputted by the printing module, assigns additional information indicating an additional page inserted by the printing module, and sequentially notifies the inspection apparatus of the page information and the additional information. The inspection apparatus receives the notified page information and additional information, compares the page information and the additional information, and performs inspection by comparing a printed material according to the inspection job excluding the additional page from the product based on a comparison result and pre-registered correct images corresponding to respective pages of the printed material.

10 Claims, 10 Drawing Sheets

(56) References Cited

U.S. PATENT DOCUMENTS

| | | | | |
|---|---|---|---|---|
| 2011/0179961 | A1* | 7/2011 | Yanagawa | G06F 3/1256 101/483 |
| 2012/0288294 | A1* | 11/2012 | Nonaka | B41J 11/485 399/66 |
| 2012/0314253 | A1* | 12/2012 | Kurihara | H04N 1/0009 358/1.15 |
| 2013/0141750 | A1* | 6/2013 | Suzuki | G06F 3/1235 358/1.14 |
| 2017/0228200 | A1* | 8/2017 | Kessels | H04N 1/00411 |
| 2020/0234421 | A1* | 7/2020 | Kaminaka | H04N 1/00472 |
| 2020/0322492 | A1* | 10/2020 | Kurohata | H04N 1/00018 |

FOREIGN PATENT DOCUMENTS

| | | | | |
|---|---|---|---|---|
| JP | 2012165331 | * | 8/2012 | G06F 3/12 |
| JP | 2013233764 | * | 11/2013 | B41J 29/46 |
| JP | 2019048387 | * | 3/2019 | H04N 1/00 |
| JP | 102020001712 | * | 10/2020 | H04N 1/00079 |

* cited by examiner

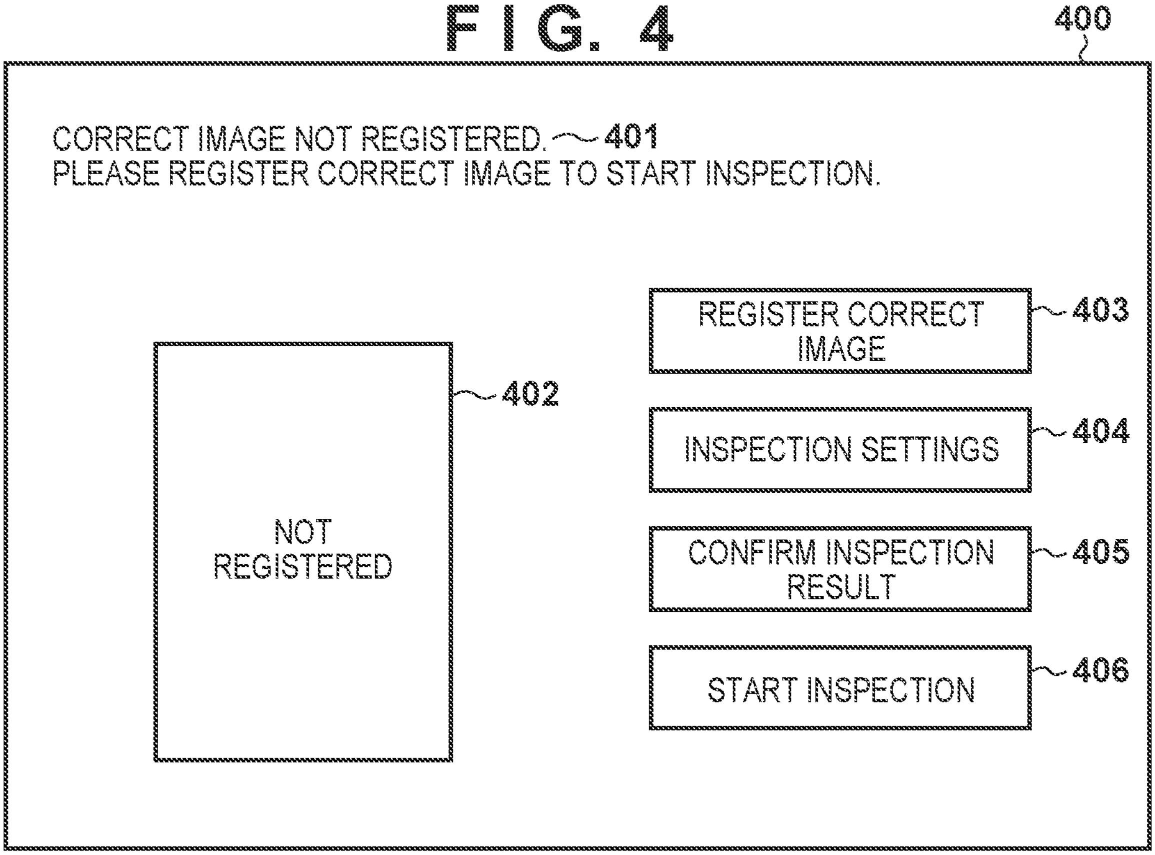

FIG. 4

CORRECT IMAGE NOT REGISTERED. — 401
PLEASE REGISTER CORRECT IMAGE TO START INSPECTION.

NOT REGISTERED — 402

REGISTER CORRECT IMAGE — 403

INSPECTION SETTINGS — 404

CONFIRM INSPECTION RESULT — 405

START INSPECTION — 406

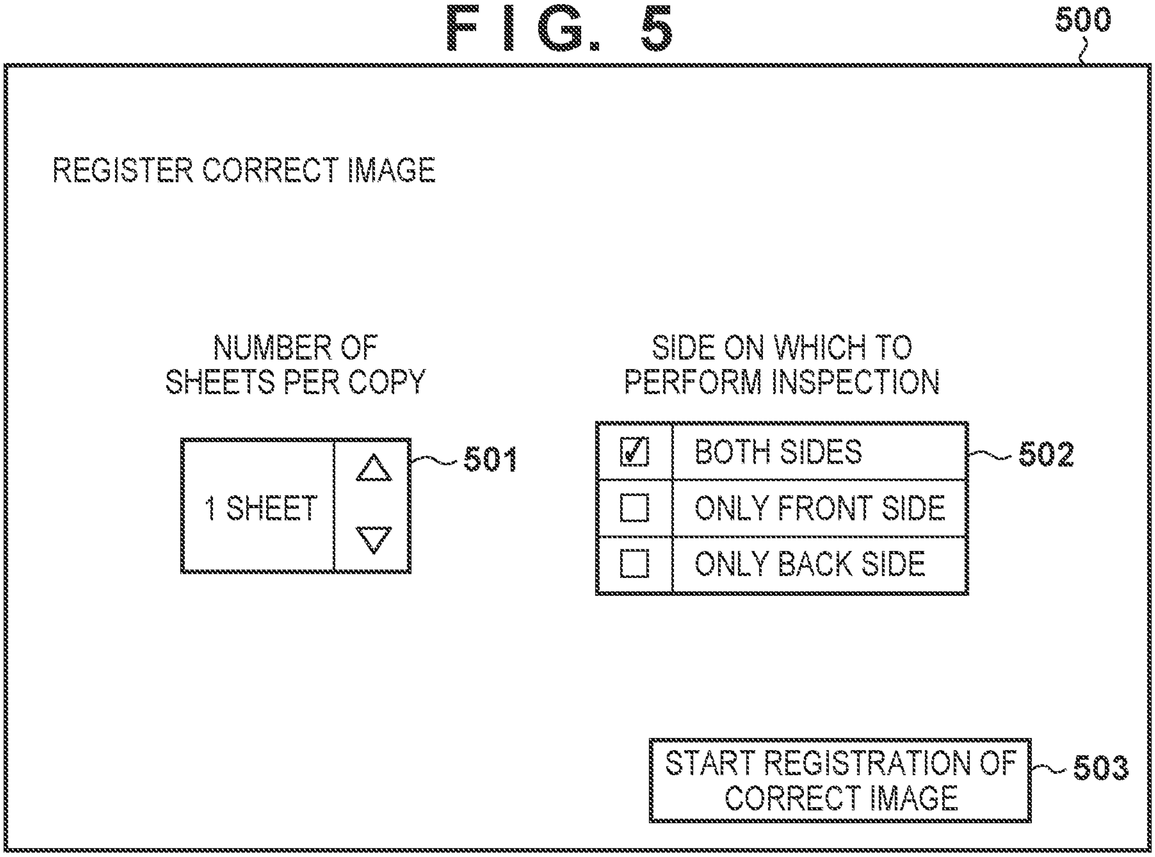

FIG. 5

REGISTER CORRECT IMAGE

NUMBER OF SHEETS PER COPY

1 SHEET — 501

SIDE ON WHICH TO PERFORM INSPECTION

☑ BOTH SIDES — 502
☐ ONLY FRONT SIDE
☐ ONLY BACK SIDE

START REGISTRATION OF CORRECT IMAGE — 503

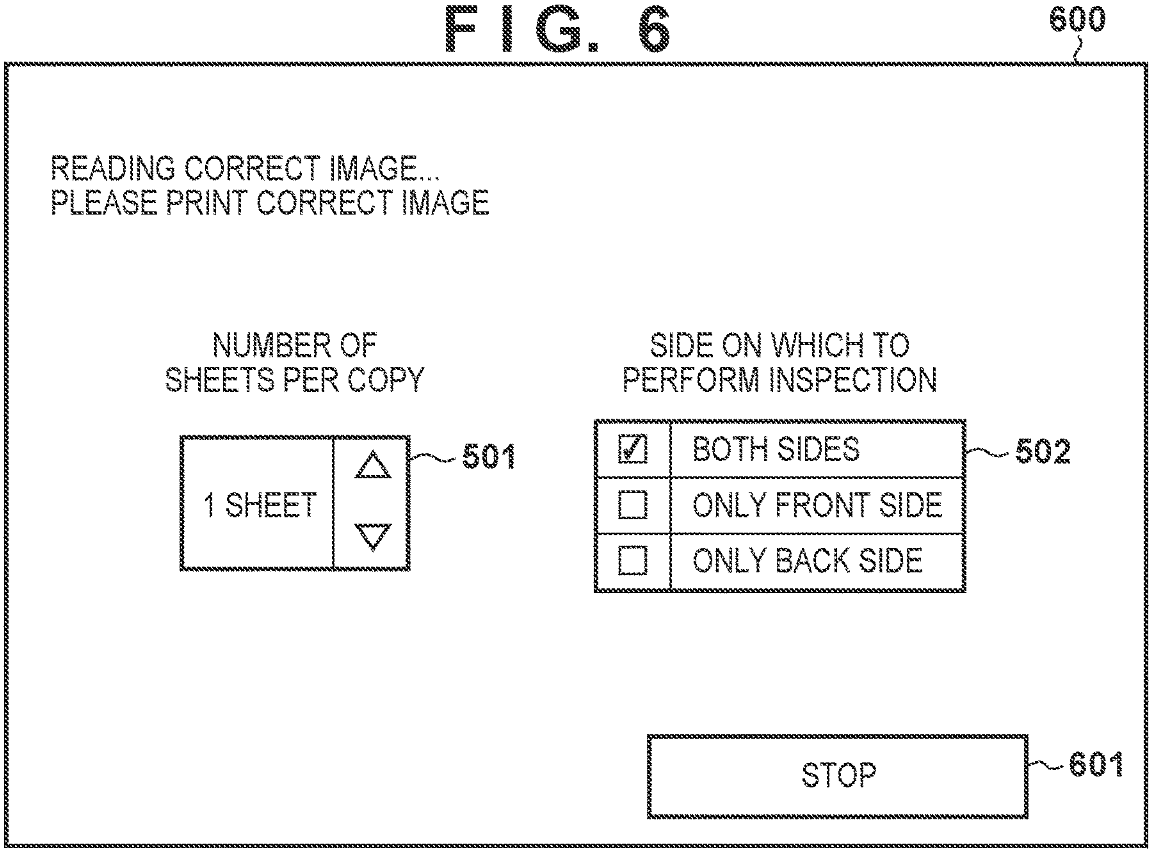

FIG. 6

READING CORRECT IMAGE...
PLEASE PRINT CORRECT IMAGE

NUMBER OF SHEETS PER COPY

1 SHEET ~501

SIDE ON WHICH TO PERFORM INSPECTION

☑ BOTH SIDES
☐ ONLY FRONT SIDE
☐ ONLY BACK SIDE
~502

STOP ~601

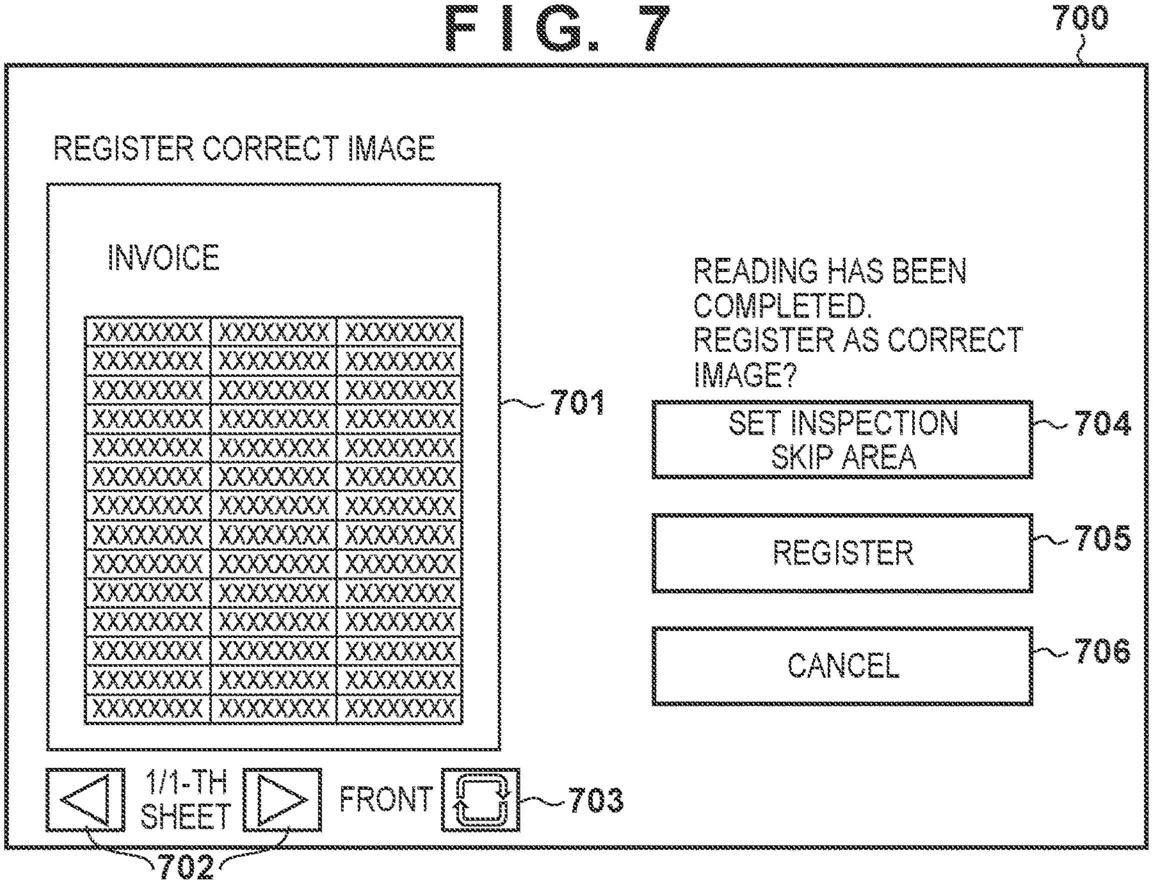

FIG. 7

REGISTER CORRECT IMAGE

INVOICE

| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |

~701

READING HAS BEEN COMPLETED.
REGISTER AS CORRECT IMAGE?

SET INSPECTION SKIP AREA ~704

REGISTER ~705

CANCEL ~706

◁ 1/1-TH SHEET ▷ FRONT ~703
~702

PRINTING SYSTEM, PRINTING APPARATUS, INSPECTION APPARATUS, CONTROL METHOD THEREOF, AND STORAGE MEDIUM

BACKGROUND OF THE INVENTION

Field of the Invention

The present invention relates to a printing system, a printing apparatus, an inspection apparatus, and a control method thereof, and a storage medium.

Description of the Related Art

There are printing systems that incorporate an in-line inspection apparatus and are capable of performing printing and output while inspecting a print result. In such printing systems, it is determined whether there is a printing defect by comparing a correct image, which is an image that is an evaluation criterion and is registered for comparison, and a read image, which is an image obtained by optically reading a printed material.

For example, Japanese Patent Laid-Open No. 2006-297739 proposes a printing system including a recovery function for performing a reprint for a sheet having a printing defect. In this printing system, inspection processing is executed for all of the sheets including sheets subsequent to a sheet determined to have a printing defect (hereinafter referred to as a "defective sheet"). Then, after all of the pages included in that job have been printed, an image of the sheet determined to be a defective sheet is reprinted.

Further, Japanese Patent Laid-Open No. 2007-41505 proposes performing confirmation printing for confirming a finished state of a product even during printing of a large number of sheets. According to this proposal, when an instruction for confirming a finished state is received from an operator, a printing system performs control so as to duplicate a page that is currently being printed and discharge the duplicate to a sheet discharge destination (such as a sample tray, for example) so that an operator can manually confirm a printed material. This makes it possible for the operator to confirm at an arbitrary timing a finished state of a product that is being printed.

However, there are the following problems to the aforementioned conventional techniques. In the aforementioned conventional techniques, when confirmation printing is performed, a page is duplicated as described above in order to output a sample page for confirming a finished state. Therefore, if inspection is performed by the aforementioned printing system incorporating an in-line inspection apparatus, there will be an inconsistency between a page order of images read by the inspection apparatus and a page order of correct images, which are pre-registered images that are evaluation criteria. As a result, a result of inspection of pages subsequent to the page that has been duplicated due to confirmation printing being executed will be determined to be NG (bad).

There also are functions, such as inserting a divider sheet between copies in which a divider sheet is inserted for each copy and inserting a slip sheet for each fixed number of sheets with an intention of preventing offsetting and staining, facilitating confirmation of collation and quantity, and the like. There also are settings for automatically outputting a banner page on which a barcode for operation and information of a product, such as printing date and time and a user ID, are described; for printing on index sheets, a function for forcibly discharging remaining index sheets for each copy; and the like. Regarding these functions, a printing apparatus also performs control so as to generate and output a page that is not in a document. Therefore, if these functions are set during inspection, similarly to the case of confirmation printing, a result of inspection of pages subsequent to the page that has been generated by the printing apparatus will be determined to be NG.

The present invention has been made in view of at least one of the aforementioned problems and provides a mechanism for appropriately identifying a page that is not an inspection target and excluding it from inspection targets even when a page order of a document being inspected is shifted due to a predetermined interruption function.

SUMMARY OF THE INVENTION

The present invention enables realization of a mechanism for appropriately identifying a page that is not an inspection target and excluding it from inspection targets even when a page order of a document being inspected is shifted due to a predetermined interruption function.

One aspect of the present invention provides a printing system including a printing apparatus and an inspection apparatus configured to inspect a product outputted by the printing apparatus, the printing apparatus comprising: a printing unit configured to perform printing in accordance with a page order of an inspection job and, in a case where a predetermined interruption function is instructed during execution of the inspection job, insert, in a printed material of the inspection job that is being executed, an additional page according to the predetermined interruption function; a notification unit configured to sequentially assign page information to each product outputted by the printing unit, assign additional information indicating the additional page inserted by the printing unit, and sequentially notify the inspection apparatus of the page information and the additional information; and a conveyance unit configured to sequentially convey to the inspection apparatus products including the printed material and the additional page; and the inspection apparatus comprising: a reception unit configured to receive the page information and the additional information notified by the notification unit; a comparison unit configured to compare the page information and the additional information; and an inspection unit configured to perform inspection by comparing the printed material according to the inspection job, obtained by excluding the additional page from the products based on a result of the comparison of the comparison unit, and a pre-registered correct image corresponding to a respective page of the printed material.

Another aspect of the present invention provides a method of controlling a printing system including a printing apparatus and an inspection apparatus configured to inspect a product outputted by the printing apparatus, the method comprising: in the printing apparatus, performing printing in accordance with a page order of an inspection job and, in a case where a predetermined interruption function is instructed during execution of the inspection job, inserting, in a printed material of the inspection job that is being executed, an additional page according to the predetermined interruption function; sequentially assigning page information to each product outputted in the printing, assigning additional information indicating the inserted additional page, and sequentially notifying the inspection apparatus of the page information and the additional information; and sequentially conveying to the inspection apparatus products including the printed material and the additional page, and in the inspection apparatus, receiving the notified page information and additional information; comparing the page information and the additional information; and performing inspection by comparing the printed material according to the inspection job, obtained by excluding the additional page from the products based on a result of the comparing, and a pre-registered correct image corresponding to a respective page of the printed material.

Still another aspect of the present invention provides a printing apparatus comprising: a printing unit configured to perform printing in accordance with a page order of an inspection job and, in a case where a predetermined interruption function is instructed during execution of the inspection job, insert, in a printed material of the inspection job that is being executed, an additional page according to the predetermined interruption function; a notification unit configured to sequentially assign page information to each product outputted by the printing unit, further assign additional information to the additional page inserted by the printing unit, and sequentially notify an inspection apparatus configured to inspect a printed material according to the inspection job of the page information and the additional information; and a conveyance unit configured to sequentially convey to the inspection apparatus products including the printed material and the additional page.

Yet still another aspect of the present invention provides an inspection apparatus operable to inspect a product from a printing apparatus configured to perform printing in accordance with a page order of an inspection job, the inspection apparatus comprising: a reception unit configured to receive page information assigned to each product outputted by the printing apparatus and, in a case where an additional page according to a predetermined interruption function has been added during execution of printing of the inspection job in the printing apparatus, additional information indicating that additional page; a comparison unit configured to compare the page information and the additional information; and an inspection unit configured to perform inspection by comparing the printed material according to the inspection job, obtained by excluding the additional page from the products based on a result of the comparison of the comparison unit, and a pre-registered correct image corresponding to a respective page of the printed material.

Still yet another aspect of the present invention provides a method of controlling a printing apparatus, the method comprising: performing printing in accordance with a page order of an inspection job and, in a case where a predetermined interruption function is instructed during execution of the inspection job, inserting, in a printed material of the inspection job that is being executed, an additional page according to the predetermined interruption function, by a printing unit; sequentially assigning page information to each product outputted in the printing, further assigning additional information to the inserted additional page, and sequentially notifying an inspection apparatus configured to inspect a printed material according to the inspection job of the page information and the additional information, by the notification unit; and sequentially conveying to the inspection apparatus products including the printed material and the additional page, by a conveyance unit.

Still yet another aspect of the present invention provides a method of controlling an inspection apparatus configured to inspect a product from a printing apparatus configured to perform printing in accordance with a page order of an inspection job, the method comprising: receiving page information assigned to each product outputted by the printing apparatus and, in a case where an additional page according to a predetermined interruption function has been added during execution of printing of the inspection job in the printing apparatus, additional information indicating that additional page; comparing the page information and the additional information; and performing inspection by comparing the printed material according to the inspection job, obtained by excluding the additional page from the products based on a result of the comparing, and a pre-registered correct image corresponding to a respective page of the printed material.

Yet still another aspect of the present invention provides a non-transitory computer-readable storage medium storing a computer program for causing a computer to execute each process in a method of controlling a printing apparatus, the method comprising: performing printing in accordance with a page order of an inspection job and, in a case where a predetermined interruption function is instructed during execution of the inspection job, inserting, in a printed material of the inspection job being executed, an additional page according to the predetermined interruption function; sequentially assigning page information to each product outputted in the printing, further assigning additional information to the inserted additional page, and sequentially notify an inspection apparatus configured to inspect a printed material according to the inspection job of the page information and the additional information; and sequentially conveying to the inspection apparatus products including the printed material and the additional page.

Still yet another aspect of the present invention provides a non-transitory computer-readable storage medium storing a computer program for causing a computer to execute each process in a method of controlling an inspection apparatus configured to inspect a product from a printing apparatus configured to perform printing in accordance with a page order of an inspection job, the method comprising: receiving page information assigned to each product outputted by the printing apparatus and, in a case where an additional page according to a predetermined interruption function has been added during execution of printing of the inspection job in the printing apparatus, additional information indicating that additional page; comparing the page information and the additional information; and performing inspection by comparing the printed material according to the inspection job, obtained by excluding the additional page from the products based on a result of the comparing, and a pre-registered correct image corresponding to a respective page of the printed material.

Further features of the present invention will be apparent from the following description of exemplary embodiments with reference to the attached drawings.

BRIEF DESCRIPTION OF THE DRAWINGS

FIG. 4 is a diagram illustrating an example of a UI screen of an inspection module according to the embodiment.

FIG. 5 is a diagram illustrating an example of a UI screen of the inspection module according to the embodiment.

FIG. 6 is a diagram illustrating an example of a UI screen of the inspection module according to the embodiment.

FIG. 7 is a diagram illustrating an example of a UI screen of the inspection module according to the embodiment.

DESCRIPTION OF THE EMBODIMENTS

Figure 1:
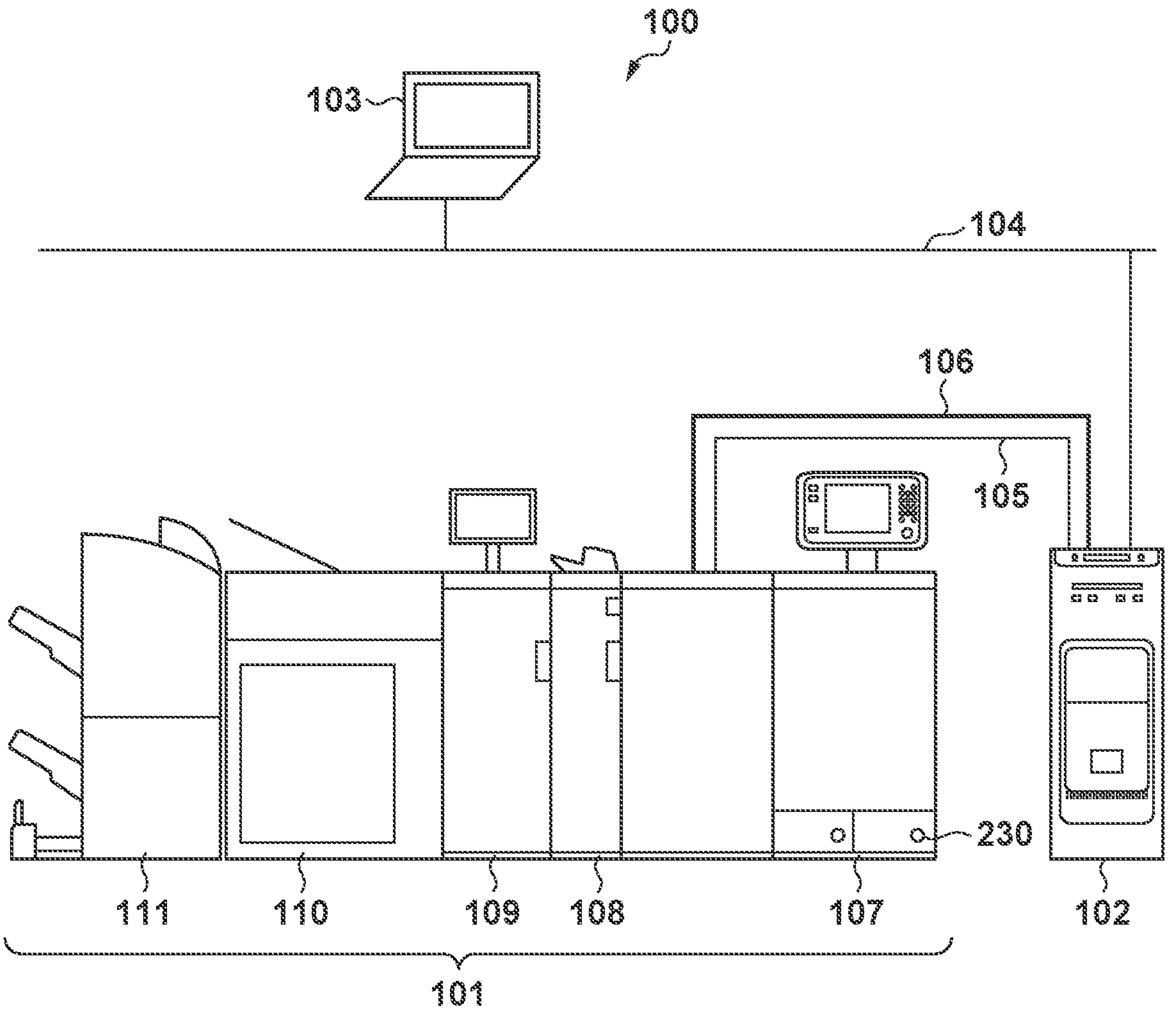
FIG. 1 is a diagram illustrating an example of a configuration of a printing system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

<Overall Configuration of Printing System>

Hereinafter, a first embodiment of the present invention will be described. First, an example of a configuration of a printing system according to the present embodiment will be described with reference to FIG. 1.

A printing system 100 includes an image forming apparatus 101 and an external controller 102. The image forming apparatus 101 and the external controller 102 are connected via an internal LAN 105 and a video cable 106 so as to be capable of communication with each other. The external controller 102 is also connected to a client PC 103 via an external LAN 104 so as to be capable of communication therewith.

A printer driver including a function for converting image data that is a target of print processing into a page description language (PDL) that can be processed by the external controller 102 is installed on the client PC 103. A user who wants to perform printing can give a print instruction from various applications via the printer driver. The printer driver transmits PDL data to the external controller 102 based on a print instruction from the user. When PDL data is received from the client PC 103, the external controller 102 creates print data (hereinafter referred to as a "print job") capable of being processed by the image forming apparatus 101 by performing PDL analysis and rasterization processing and inputs it into the image forming apparatus 101. Although a description will be given using the client PC 103 as an example of an external apparatus, there is no intention to limit the present invention, and it may be any apparatus on which the printer driver can be installed, such as a tablet, a smartphone, and a PDA terminal, for example. The external LAN 104 can be a wireless LAN or a wired LAN.

Next, the image forming apparatus 101 will be described. The image forming apparatus 101 includes a printing module 107, an inserter 108, an inspection module 109, a stacker 110, and a finisher 111. The respective modules will be described in the following.

The printing module 107 forms, according to a print job, an image on a sheet (also referred to as a printing medium) serving as a printing medium and conveyed from a sheet feeding unit 230, using toner as a printing agent. The inserter 108 is an apparatus for inserting, for example, a divider sheet or the like for partitioning sheets at an arbitrary position, into sheets that have been conveyed after being print-processed by the printing module 107. The inspection module 109 reads an image of a product conveyed from the printing module 107 and determines whether an image that has been formed on that sheet is normal, that is, whether there is a printing defect, by comparing it with a pre-registered correct image (also referred to as a "reference image"). According to the present embodiment, the aforementioned products may include, in addition to a sheet that accords with an inspection job and has been printed, additional pages such as an inserted sheet and a confirmation printout.

The stacker 110 is a large-volume accumulation apparatus capable of stacking print-processed sheets. The finisher 111 is a post-processing apparatus including various finishing processing functions, such as stapling, punching, and saddle-stitch bookbinding. It applies, to a conveyed print-processed sheet, finishing processing that has been selected or set in advance. A finishing-processed sheet is discharged to a sheet discharge tray.

The printing system described here is configured to input a print job via the external controller 102; however, for example, a configuration may be taken so as to omit the external controller 102. That is, a configuration may be taken so as to connect the image forming apparatus 101 to the external LAN 104 and transmit PDL data from the client PC 103 to the image forming apparatus 101. In this case, print processing is executed after a print job is generated by performing PDL analysis and rasterization processing in the image forming apparatus 101. Further, in the example of FIG. 1, the external controller 102 and the image forming apparatus 101 are connected to each other by the internal LAN 105 and the video cable 106; however, a configuration need only be capable of transmitting and receiving data necessary for printing. For example, they may be connected only by either the internal LAN 105 or the video cable 106.

<Internal Configuration of Printing System>

Next, an internal configuration of the image forming apparatus 101, the external controller 102, and the client PC 103 configuring the printing system 100 will be described with reference to FIGS. 2A and 2B.

(Internal Configuration of Printing Module)

First, an internal configuration of the printing module 107 of the image forming apparatus 101 will be described. The printing module 107 includes, as components mainly relating to control, a communication I/F 217, a LAN I/F 218, a video I/F 220, an HDD 221, a CPU 222, a memory 223, an operation unit 224, and a display 225. Furthermore, the printing module 107 includes, as components mainly relating to image formation, a document reading unit 226, a laser exposure unit 227, an image forming unit 228, a fixing unit 229, and the sheet feeding unit 230. The respective components are connected via a system bus 231. The communication I/F 217 is connected to the inserter 108, the inspection module 109, the stacker 110, and the finisher 111 via a communication cable 254, and communication for controlling the respective apparatuses is performed. The LAN I/F 218 is connected to the external controller 102 via the internal LAN 105, and communication of print data and the like is performed. The video I/F 220 is connected to the external controller 102 via the video cable 106, and communication of image data and the like is performed.

The HDD 221 is a storage apparatus in which programs and data are stored. The CPU 222 controls the entire printing module 107 based on programs and the like stored in the HDD 221. The memory 223 is configured by a ROM, a RAM, and the like; stores programs necessary for when the CPU 222 performs various kinds of processing and image data; and operates as a work area. The operation unit 224 receives operation instructions and input of various settings from the user. The display 225 is a display apparatus that displays various kinds of setting information related to print processing, a print job processing status, and the like.

The document reading unit 226 is a scanner apparatus that optically reads a document when a copy function or a scan function is used. The document reading unit 226 generates image data by optically reading an image on a document by capturing an image with a CCD camera while illuminating an exposure lamp on a sheet placed by a user. The laser exposure unit 227 is an apparatus for performing primary charging for irradiating a laser beam and laser exposure. The laser exposure unit 227 first performs primary charging in which a surface of a photosensitive drum is charged to a uniform negative potential. Next, a laser beam is irradiated on the photosensitive drum by a laser driver while an angle of reflection is adjusted by a polygon mirror. By this, a negative charge of an irradiated portion is neutralized, and an electrostatic latent image is formed. The image forming unit 228 is an apparatus for transferring toner to a sheet. The image forming unit 228 is configured by a developing unit, a transfer unit, a toner replenishment unit, and the like (not illustrated) and transfers toner on the photosensitive drum to a sheet. The developing unit visualizes an electrostatic latent image on a surface of the photosensitive drum by adhering negatively-charged toner to it from a developing cylinder. The transfer unit performs primary transfer in which a positive potential is applied to a primary transfer roller and toner on a surface of the photosensitive drum is transferred to a transfer belt and secondary transfer in which a positive potential is applied to a secondary transfer outer roller and toner on the transfer belt is transferred to a sheet. The fixing unit 229 is an apparatus for melting and fixing toner on a sheet to the sheet with heat and pressure and is configured by a heater, a fixing belt, a pressure belt, and the like (not illustrated). The sheet feeding unit 230 is an apparatus for feeding a sheet to be print-processed. The sheet feeding unit 230 performs a sheet feeding operation and a sheet conveyance operation by a roller (not illustrated) and various sensors.

(Internal Configuration of Inserter)

Next, an internal configuration of the inserter 108 of the image forming apparatus 101 will be described. The inserter 108 is configured to include a communication I/F 232, a CPU 233, a memory 234, and a sheet feeding control unit 235, and the respective components are connected via a system bus 236.

The communication I/F 232 is connected to the printing module 107 via the communication cable 254 and performs communication necessary for control for inserting a sheet. The CPU 233 controls the entire inserter 108 in accordance with a control program stored in the memory 234. The memory 234 is a storage apparatus in which the control program is stored. Based on instructions from the CPU 233, the sheet feeding control unit 235 controls feeding of a sheet placed on a tray 321 of FIG. 3, feeding of a sheet from a sheet feeding unit (not illustrated), and conveyance of a sheet conveyed from the printing module 107, while controlling rollers and sensors (not illustrated).

(Internal Configuration of Inspection Module)

Next, an internal configuration of the inspection module 109 of the image forming apparatus 101 will be described. The inspection module 109 is configured to include a communication I/F 237, a CPU 238, a memory 239, an image capturing unit 240, a display unit 241, an operation unit 242, and an inspection unit 243, and the respective components are connected via a system bus 256.

The communication I/F 237 is connected to the printing module 107 via the communication cable 254 and performs communication necessary for control for inspecting a print-processed sheet and the like. The CPU 238 controls the entire inspection module 109 in accordance with a control program stored in the memory 239. The memory 239 is a storage apparatus for storing, in addition to the control program, various kinds of setting information and image data. The image capturing unit 240 reads an image on a conveyed print-processed sheet by performing image capturing based on an instruction of the CPU 238. Although in the present embodiment an image on a sheet is read by performing image capturing with a camera, it may be read by, for example, an in-line scanner or the like. That is, the present invention can be applied to a configuration so as long as it is capable of obtaining an image of a conveyed sheet.

The inspection unit 243 determines whether there is a defect in a print result by comparing a captured image (also referred to as an inspection image) that is an inspection target obtained by the image capturing unit 240 and a correct image (also referred to as a reference image) stored in advance in the memory 239. The display unit 241 displays an inspection result, a setting screen, and the like. The operation unit 242 is operated by the user and receives instructions for changing a setting of the inspection module 109, registering a correct image, and the like.

(Internal Configuration of Stacker)

Next, an internal configuration of the stacker 110 of the image forming apparatus 101 will be described. The stacker 110 is configured to include a communication I/F 244, a CPU 245, a memory 246, and a sheet discharge control unit 247, and the respective components are connected via a system bus 248. The communication I/F 244 is connected to the printing module 107 via the communication cable 254 and performs communication necessary for control for accumulating and discharging a sheet. The CPU 245 controls the entire stacker 110 in accordance with a control program stored in the memory 246. The memory 246 is a storage apparatus in which the control program is stored. The sheet discharge control unit 247 performs control for conveying a conveyed sheet to a stack tray, an escape tray, or the subsequent finisher 111 based on instructions from the CPU 245.

(Internal Configuration of Finisher)

Next, an internal configuration of the finisher 111 of the image forming apparatus 101 will be described. The finisher 111 is configured to include a communication I/F 249, a CPU 250, a memory 251, a sheet discharge control unit 252, and a finishing processing unit 253, and the respective components are connected via a system bus 255. The communication I/F 249 is connected to the printing module 107 via the communication cable 254 and performs communication necessary for control for finishing processing. The CPU 250 controls the entire finisher 111 in accordance with a control program stored in the memory 251. The memory 251 is a storage apparatus in which the control program is stored. The sheet discharge control unit 252 controls sheet conveyance and sheet discharge based on instructions from the CPU 250. The finishing processing unit 253 executes processing, such as stapling, punching, and saddle-stitch bookbinding, based on instructions from the CPU 250.

(Internal Configuration of External Controller)

Next, an internal configuration of the external controller 102 will be described. The external controller 102 is configured to include a CPU 208, a memory 209, an HDD 210, a keyboard 211, a display 212, a LAN I/F 213, a LAN I/F 214, and a video I/F 215, which are connected via a system bus 216. The CPU 208 executes processing such as reception of PDL data from the client PC 103, RIP processing, and transmission of a print job to the image forming apparatus 101 based on programs and data stored in the HDD 210. The memory 209 stores programs and data necessary for when the CPU 208 performs various kinds of processing and operates as a work area. The HDD 210 stores programs and data necessary for operations, such as PDL analysis and RIP processing.

The keyboard 211 is an input device for the user to input various operations and instructions to the external controller 102. Information, such as an application being executed by the external controller 102, is displayed on the display 212 as a still image or a moving image. The LAN I/F 213 is connected to the client PC 103 via the external LAN 104, and reception of PDL data and the like is performed. The LAN I/F 214 is connected to the image forming apparatus 101 via the internal LAN 105, and transmission of a print job and the like is performed. The video I/F 215 is connected to the image forming apparatus 101 via the video cable 106 and performs transmission and reception of image data and the like.

(Internal Configuration of Client PC)

Next, an internal configuration of the client PC 103 will be described. The client PC 103 is configured to include a CPU 201, a memory 202, an HDD 203, a keyboard 204, a display 205, and a LAN I/F 206, which are connected via a system bus 207. The CPU 201 creates image data that is a target of print processing and executes a print instruction based on a document creation program and the like stored in the HDD 203. The CPU 201 also comprehensively controls the respective devices connected to the system bus 207. The memory 202 stores programs and data necessary for when the CPU 201 performs various kinds of processing and operates as a work area. The HDD 203 stores programs and data necessary for operation, such as print processing.

The keyboard 204 is an input device for the user to input various operations and instructions to the client PC 103. Information, such as an application being executed by the client PC 103, is displayed on the display 205 as a still image or a moving image. The LAN I/F 206 is connected to the external LAN 104, and transmission of PDL data and the like are performed.

Figure 2A:
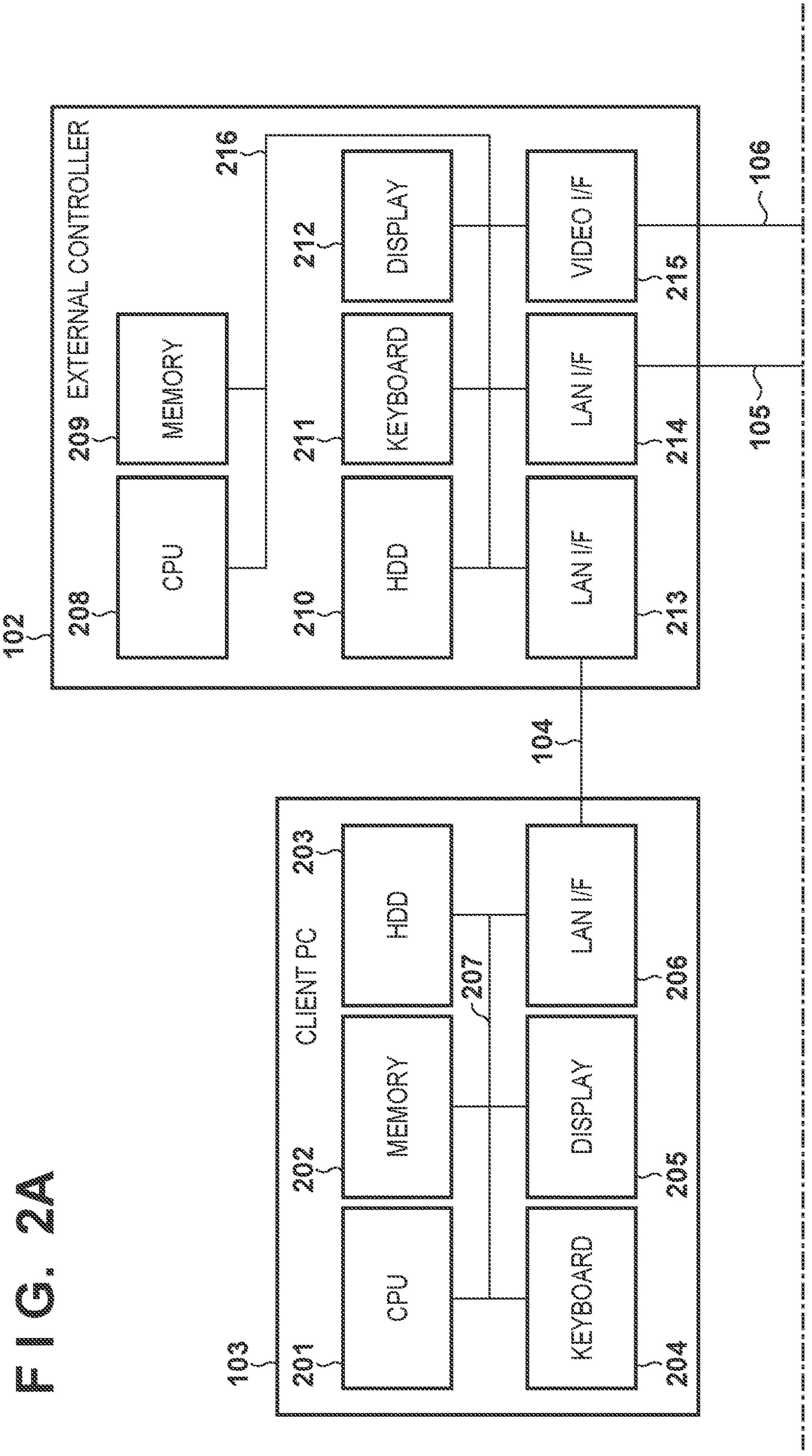
FIGS. 2A and 2B are a block diagram illustrating an internal configuration of an image forming apparatus, an external controller, and a client PC configuring the printing system according to the embodiment.
Figure 2B:
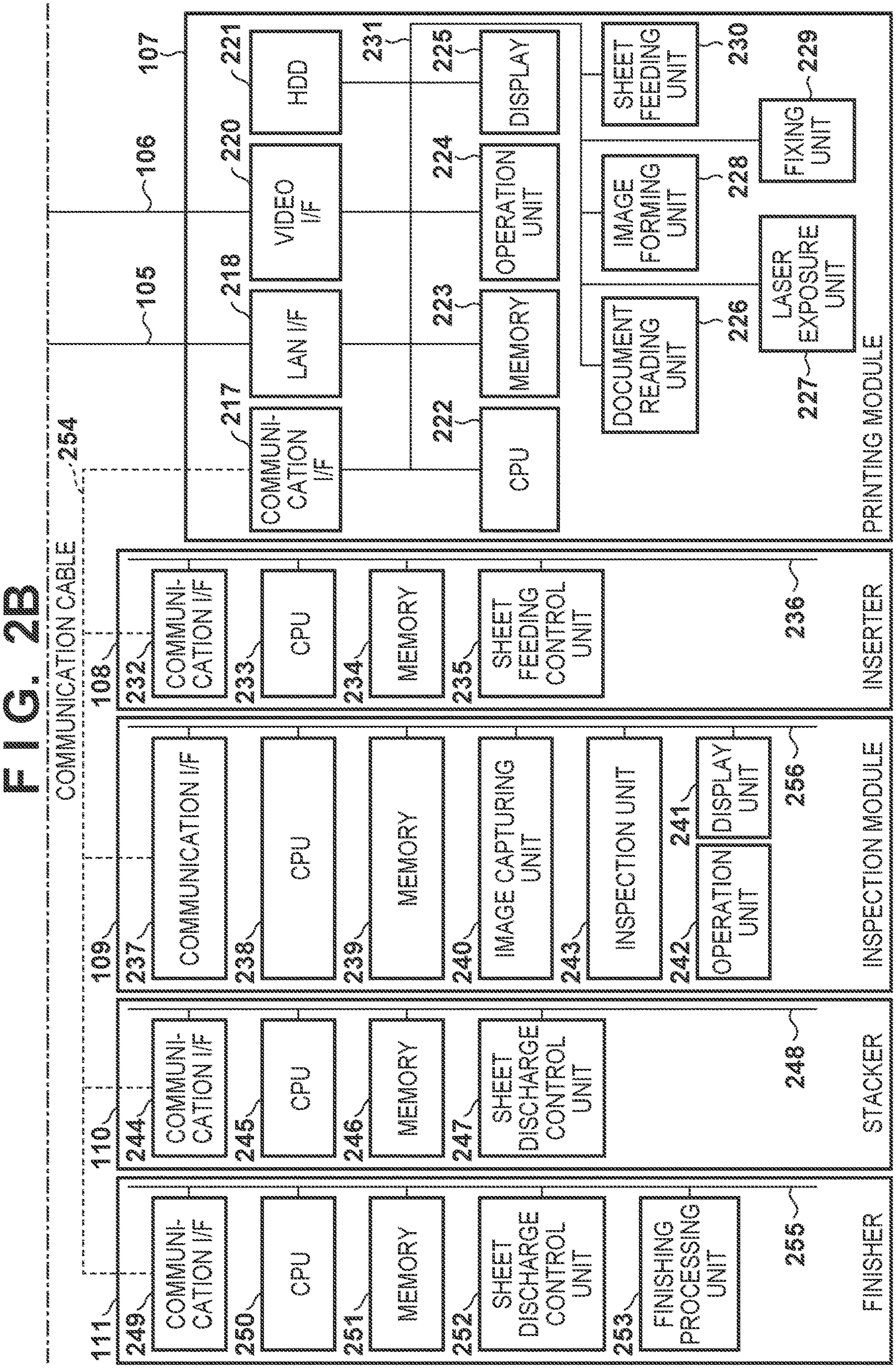

In addition, each of the memory 202, the memory 209, the memory 223, the memory 234, the memory 239, the memory 246, and the memory 251 illustrated in FIGS. 2A and 2B need only be a storage apparatus for holding data and programs. For example, a configuration may be taken so as to replace them with a volatile RAM, a non-volatile ROM, an internal HDD, an external HDD, a USB memory, and the like.

<Conveyance System of Image Forming Apparatus>

Figure 3:
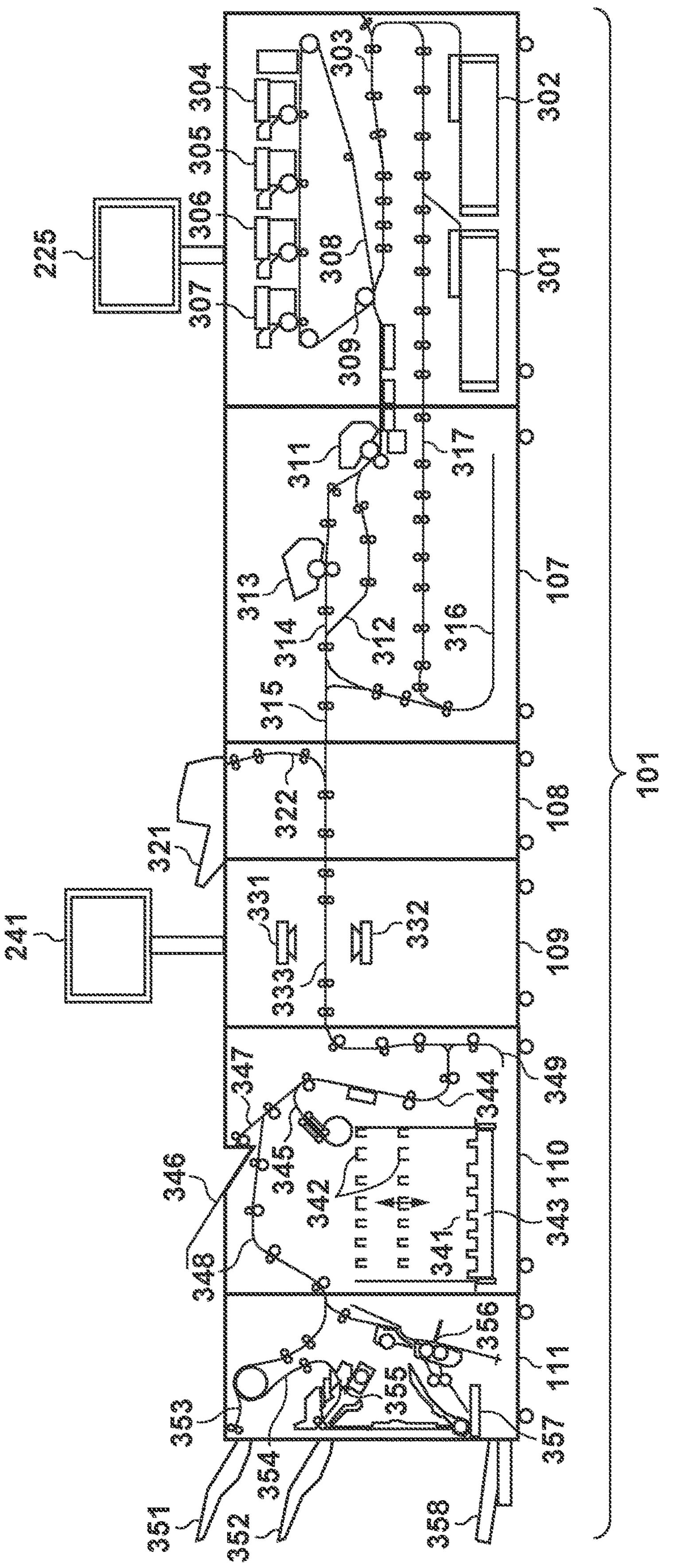
FIG. 3 is a cross-sectional diagram of a mechanism of the image forming apparatus according to the embodiment.

Next, a conveyance system of the image forming apparatus 101 will be described with reference to FIG. 3. FIG. 3 illustrates a cross-sectional diagram of a mechanism of the image forming apparatus 101.

The printing module 107 includes sheet feeding decks 301 and 302, an intermediate transfer belt 308, development stations 304 to 307, the display 225, a fixing unit 311, and a second fixing unit 313. Further, the printing module 107 includes sheet conveyance paths 303, 312, 314, and 315, a sheet reversing path 316, and a double-sided conveyance path 317 as paths for conveying sheets.

Each of the sheet feeding decks 301 and 302 can accommodate various sheets. The sheet feeding decks 301 and 302 separate only a single uppermost sheet among the accommodated sheets and convey the sheet to the sheet conveyance path 303. The developing stations 304 to 307 form toner images using colored toners, each of yellow (Y), magenta (M), cyan (C), and black (K). First, the formed toner images are primarily transferred to the intermediate transfer belt 308. The intermediate transfer belt 308 rotates clockwise in FIG. 3, and toner images on the intermediate transfer belt 308 are transferred at a secondary transfer position 309 to a sheet conveyed from the sheet conveyance path 303.

The display 225 displays a print job processing status and information for various settings. The fixing unit 311 includes a pressure roller and a heating roller and fixes toner images to a sheet by melting and pressure-bonding the toner by passing the sheet between the rollers. A sheet that has passed through the fixing unit 311 passes through the sheet conveyance path 312 and is conveyed to the sheet conveyance path 315. When a sheet is of a sheet type that needs further melting and pressure bonding for fixing, the sheet passes through the fixing unit 311 and is then conveyed to the second fixing unit 313 via a sheet conveyance path 312' (not illustrated) above the sheet conveyance path 312. A sheet that has been subjected to additional melting and pressure bonding in the second fixing unit 313 passes through the sheet conveyance path 314 and is conveyed to the sheet conveyance path 315. Here, when a print mode setting is set to double-sided printing, a sheet is conveyed to the sheet reversing path 316; the sheet is reversed and is then conveyed to the double-sided conveyance path 317. Then, image transfer for a second side is performed at the secondary transfer position 309.

The inserter 108 includes an inserter tray 321 and a sheet conveyance path 322. When the number of sheets that are conveyed to the inserter 108 through the sheet conveyance path 315 reaches a predetermined number, the inserter 108 causes a divider sheet fed through the sheet conveyance path 322 to join the conveyance path. This makes it possible to insert at an arbitrary timing a divider sheet into a series of sheets conveyed from the printing module 107 and convey the sheets to a subsequent apparatus. A sheet that has passed through the inserter 108 is conveyed to the inspection module 109.

In the inspection module 109, a first camera 331 and a second camera 332 are disposed in a form in which they are facing each other across the sheet conveyance path 333. The first camera 331 captures a top side of a sheet, and the second camera 332 captures a bottom side of the sheet. When a sheet that has been conveyed to the sheet conveyance path 333 has reached a predetermined position, the inspection module 109 reads an image of both sides of the sheet using the first camera 331 and the second camera 332 and inspects whether there is a defect in a read image of a side that is an inspection target. On the display unit 241, a result of inspection performed by the inspection module 109 and the like are displayed. An inspected sheet is conveyed to the stacker 110.

The stacker 110 includes a stack tray 341 for stacking sheets; sheet conveyance paths 344, 345, 347, and 348; an escape tray 346; and a reversing unit 349. A sheet that has passed through the inspection module 109 is conveyed to the stacker 110 through the sheet conveyance path 344. A sheet that has been conveyed from the sheet conveyance path 344 via the sheet conveyance path 345 is stacked onto the stack tray 341 while flipping. The stack tray 341 is configured by an elevating tray 342 and an eject tray 343. In addition, the stacker 110 includes the escape tray 346 as a sheet discharge tray. The escape tray 346 is a sheet discharge tray for discharging a sheet that has been determined to have a printing defect (image defect) by the inspection module 109. When being discharged to the escape tray 346, a sheet is conveyed from the sheet conveyance path 344 to the escape tray 346 via the sheet conveyance path 347.

In a case of conveying a sheet to the finisher 111 downstream of the stacker 110, the sheet is conveyed through the sheet conveyance path 348. The reversing unit 349 is always used when switching a discharge destination of a sheet in accordance with a result of inspection in the inspection module 109. This is to buy time for reading of an image on a sheet by the two cameras 331 and 332, inspection of the read image, and switching of the conveyance path to the sheet conveyance path 345 or 348. When inspection is not performed, the reversing unit 349 is used only when flipping a sheet at the time of stacking the sheet onto the stack tray 341. A sheet for which an image defect has not been detected as a result of inspection in the inspection module 109 is conveyed to the finisher 111.

The finisher 111 includes sheet discharge trays 351 and 352; sheet conveyance paths 353, 354, and 357; a first processing mechanism 355; a second processing mechanism 356; and a saddle-stitch bookbinding tray 358. In the finisher 111, finishing processing, such as stapling (1-position and 2-position stapling), punching (2-hole and 3-hole), and saddle-stitch bookbinding, is performed on a conveyed sheet. The finisher 111 includes two sheet discharge trays 351 and 352. A sheet conveyed through the sheet conveyance path 353 is discharged to the sheet discharge tray 351. However, finishing processing, such as stapling, cannot be performed in the sheet conveyance path 353. When performing finishing processing, such as stapling, a sheet is conveyed to the first processing mechanism 355 via the sheet conveyance path 354. After a user-specified finishing function is executed in the first processing mechanism 355, the sheet is discharged to the sheet discharge tray 352.

The sheet discharge trays 351 and 352 can each be raised and lowered. Further, it is also possible to perform operation so as to lower the sheet discharge tray 351 and stack onto the sheet discharge tray 351 a sheet on which finishing processing has been performed in the first processing mechanism 355. In addition, when a saddle-stitch bookbinding function is specified among the finishing functions, sheets are folded in two after staple processing has been performed at a center of the sheets by the second processing mechanism 356 and is then discharged to the saddle-stitch bookbinding tray 358 via the sheet conveyance path 357. The saddle-stitch bookbinding tray 358 has a conveyor-belt configuration and is configured such that a sheet bundle (saddle-stitch bookbinding bundle) stacked on the saddle-stitch bookbinding tray 358 is conveyed to the left side.

<Details of Inspection Module>

Next, a description will be given in detail for a method of using the inspection module 109, such as various kinds of setting work to be performed by the user for the inspection module 109 before a start of inspection processing according to the present embodiment, using UI screens as examples, with reference to FIGS. 4 to 10.

The inspection module 109 inspects in accordance with pre-set inspection items a print-processed sheet (a product) conveyed from the printing module 107. Inspection is performed by comparing a read image (hereinafter, referred to as an "inspection image") corresponding to a side that is an inspection target among read images of both sides of a print-processed sheet obtained by capturing the sheet and a correct image registered in advance in association with a sheet side indicating either a front side or a back side. The present invention can employ various techniques as a method of comparing images. For example, a method of comparing pixel values for each of corresponding positions in two images, a method of comparing positions of objects by edge detection, a method of comparing results of recognition by optical character recognition (OCR), and the like may be employed.

(Inspection Menu Screen)

FIG. 4 illustrates an example of UI screen (hereinafter, referred to as an "inspection menu screen") displayed on the display unit 241 at a start of the inspection module 109. Display control of various UI screens including an inspection menu screen 400 is performed by the CPU 238 in the inspection module 109.

In the inspection menu screen 400, a message that a correct image needs to be registered before a start of inspection processing and that a correct image has not been registered is displayed in a message field 401 in an upper left portion. If a correct image has already been registered at the start, a message that inspection processing can be started is displayed. Below the message field 401, an image display region 402 in which a correct image is to be displayed is provided. In the example of FIG. 4, since a correct image has not been registered, a character string "not registered" is displayed.

Four buttons 403 to 406 are arranged on a right side of the inspection menu screen 400. The button 403 is a button for calling a UI screen for registering a correct image. A correct image is an image that serves as a reference when determining whether there is any defect in an inspection image. In the present embodiment, it is assumed that a read image that has been obtained by the image capturing unit 240 capturing based on the user's instruction a print-processed sheet determined in advance to be normally printed by visual observation or the like is used as a correct image.

The button 404 is a button for calling a UI screen for setting conditions for when performing inspection. The user sets inspection items and inspection precision in accordance with a purpose of inspection. Here, the inspection items include a shift of a printing position, a tone of an image, a density of the image, streaks and thin printing, a printing omission, and the like. Further, inspection precision is an index for determining at which degree of difference from a correct image to make a determination that there is a defect and is, for example, defined by a numerical value, such as within 1%.

The button 405 is a button for calling a UI screen for confirming an inspection result. The user can confirm contents of past inspections and inspection results via an inspection result confirmation screen. The button 406 is a button for instructing a start of inspection. When a press of the button 406 is detected, the inspection module 109 starts inspection of print-processed sheets to be sequentially conveyed.

The configuration of the inspection menu screen 400 illustrated in FIG. 4 is an example and the inspection menu screen 400 may be configured to display information other than the above, such as information relating to inspection settings, such as a setting of a divider sheet. Next, a description will be given for respective UI screens to be displayed when the aforementioned three UI screen call buttons 403 to 405 are pressed, and operation thereof (Registration of Correct Image)

FIG. 5 illustrates a UI screen (hereinafter, referred to as an "image registration screen") for registering a correct image. When the user presses the button 403 in the aforementioned inspection menu screen 400, an image registration screen 500 is first displayed on the display unit 241.

The image registration screen 500 includes two setting regions 501 and 502 and one button 503. The setting region 501 is a region for setting the number of sheets per copy of a print job with inspection (hereinafter referred to as "inspection job"). The user can operate a spin button in the setting region 501 to specify a desired number of sheets. In this case, when specifying two or more sheets per copy, that is, when performing inspection for a printed material configured by a plurality of sheets per copy, it is possible to register a correct image for each sheet.

The setting region 502 is a region for setting a side of a sheet to be an inspection target. It is possible to perform setting so as to perform inspection on both sides of a sheet or only on one side (in which case, only on a front side or a back side). Even when printing is performed only on one side, in order to perform inspection that no dust is adhered on a side on which printing has not been performed, it is also possible to set the inspection conditions so to perform inspection on both sides.

The button 503 is a button for starting processing for reading an image from a sample sheet and registering it as a correct image. The user places a sample sheet on the inserter tray 321, sets the aforementioned two setting regions 501 and 502, and then presses the button 503.

When the button 503 is pressed, first, the image registration screen 500 transitions to a UI screen (hereinafter, referred to as a "reading-in-progress screen") 600 indicating being on standby and that an image is being read, as illustrated in FIG. 6. Then, both sides of a sample print-processed sheet conveyed after a press of the button 503 are captured by the image capturing unit 240, and a correct image is registered in association with information of a sheet side indicating either a front side or back side based on the aforementioned setting contents in the setting region 502. It is assumed that a configuration of an apparatus is fixed such that when registering a correct image, a top side of a sheet captured by the first camera 331 is a "front side", and a bottom side of a sheet captured by the second camera 332 is a "back side".

It is assumed that the design is such that, for example, it is specified to place a sample sheet in a specific orientation, such as "front side of documents up", on the inserter tray 321 of the inserter 108 such that a top side of a sheet is always a front side when passing through the inspection module 109. However, rather than taking such a fixed apparatus configuration, a configuration may be taken so as to, for example, enable a read image of a top side of a sheet captured by the first camera 331 to be registered as a correct image of a "back side" via UI settings. In any case, a correct image is registered in association with a sheet side.

The aforementioned reading-in-progress screen 600 is continued to be displayed until an image has been read in accordance with setting contents of the setting regions 501 and 502. A button 601 in the reading-in-progress screen 600 is a button for instructing to stop image reading. When the button 601 is pressed, image reading is stopped, and the display returns to the aforementioned inspection menu screen 400.

Meanwhile, when image reading for a set number of sheets is successfully completed, the reading-in-progress screen 600 transitions to a UI screen (hereinafter, referred to as a "registration processing screen") prompting registration of a correct image and setting of related items as illustrated in FIG. 7. A left side of a registration processing screen 700 includes an image display region 701 in which a read image is displayed. Therebelow are included a button 702 for switching sheets to be displayed when one copy is configured by a plurality of sheets and a button 703 for switching whether a front side or back side of a sheet will be displayed. A configuration may be taken so as not to display the button 702 when the number of sheets per copy set on the image registration screen 500 is one. Similarly, a configuration may be taken so as not to display the button 703 when the side to be an inspection target set on the image registration screen 500 is only one side.

Figure 8:
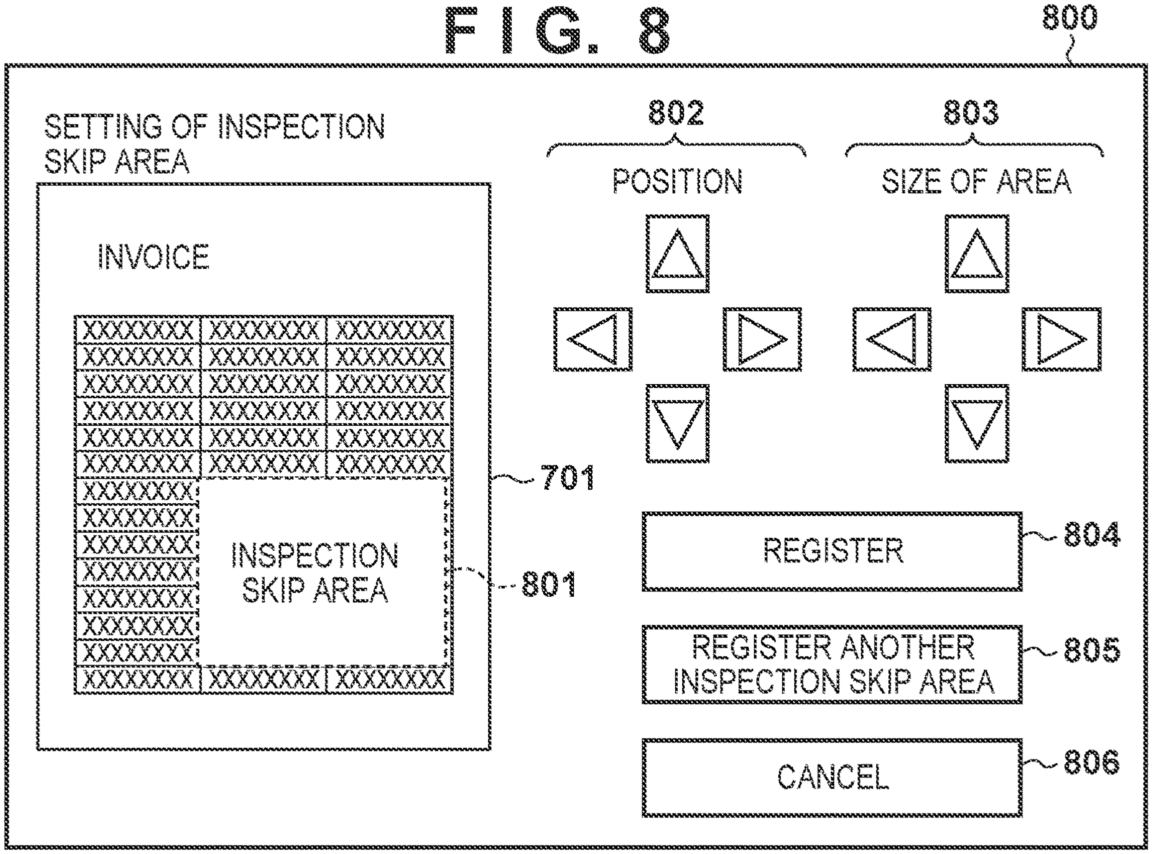
FIG. 8 is a diagram illustrating an example of a UI screen of the inspection module according to the embodiment.

On a right side of the registration processing screen 700, three buttons 704 to 706 are arranged in alignment. The button 704 is a button for setting an inspection skip area, which is an area for which a correct image and an inspection image are not compared. This inspection skip area setting is used to limit a region to be a target of inspection. For example, a case of variable data printing (VDP) in which print content is changed for a specific area in a sheet for each copy is conceivable. Alternatively, a case of performing printing after adding a different ID to each copy and a case of performing printing after changing only a portion of an address or name for each copy can also be expected. When the button 704 is pressed, the registration processing screen 700 transitions to a UI screen (hereinafter, referred to as an "area setting screen") for setting an inspection skip area as illustrated in FIG. 8.

In an area setting screen 800, a dashed rectangle 801 in the image display region 701 indicates an inspection skip area to be set. The user can change a position of the inspection skip area 801 by a position change button 802 or change its size by a size change button 803. The user can register a determined position and size of the inspection skip area 801 by pressing a button 804. By this, the set inspection skip area 801 is registered in association with a correct image being displayed in the image display region 701. After an inspection skip area has been registered, the display returns to the registration processing screen 700.

A button 805 is a button for registering another inspection skip area in the same correct image after registering a certain inspection skip area. That is, according to the present embodiment, it is possible to set in one correct image a plurality of areas for which to skip inspection. A button 806 is a button for canceling setting of an inspection skip area. When the button 806 is pressed, setting of an inspection skip area is canceled and the display returns to the registration processing screen 700.

The description of the registration processing screen 700 is returned to. A button 705 is a button for registering as a correct image a read image being displayed in the image display region 701. When the button 705 is pressed, a read image displayed on the image display region 701 is registered as a correct image in association with a corresponding sheet number (e.g., 1/10-th) and a sheet side (front side or back side). After registration is completed, the display returns from the registration processing screen 700 to the inspection menu screen 400. A button 706 is a button for canceling registration of a correct image. If the button 706 is pressed, registration processing is canceled, and the display returns to the inspection menu screen 400.

(Setting of Inspection Conditions)

Figure 9:
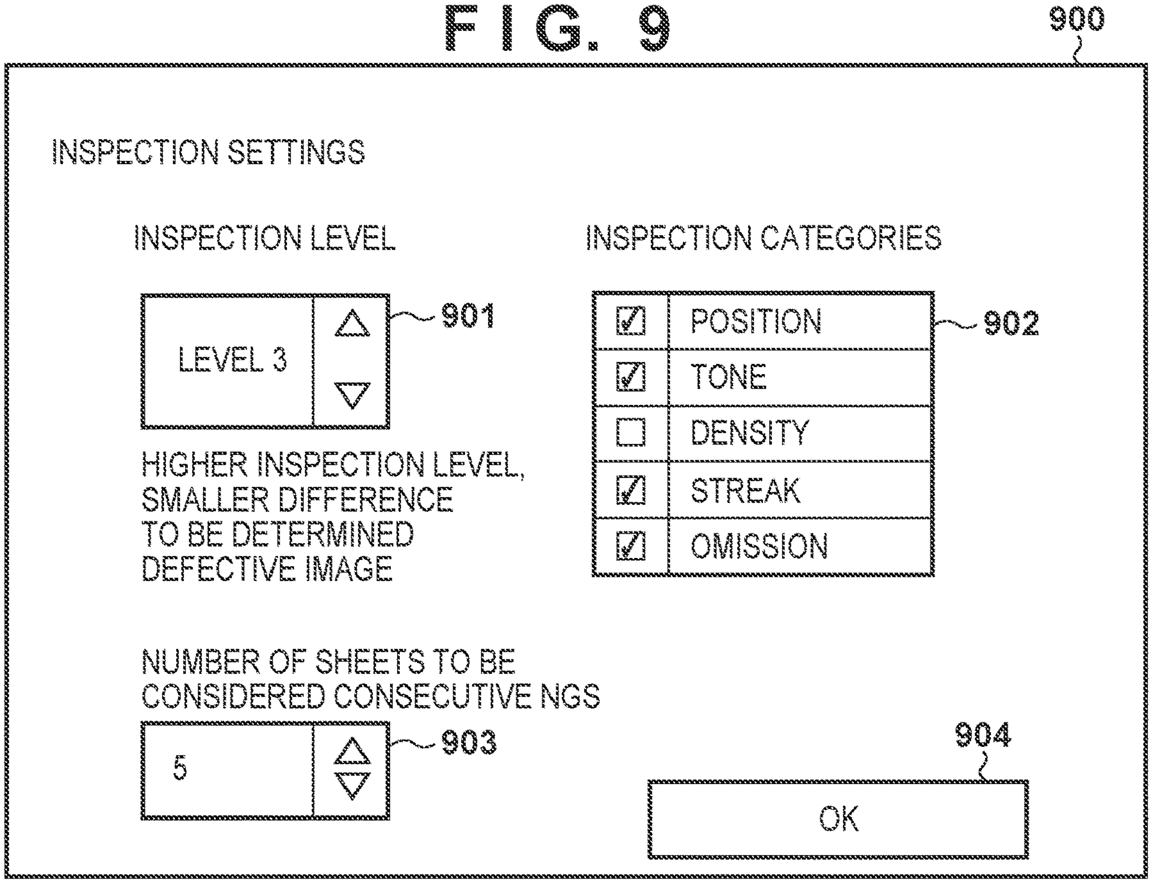
FIG. 9 is a diagram illustrating an example of a UI screen of the inspection module according to the embodiment.

When the user presses the button 404 in the aforementioned inspection menu screen 400, a UI screen (hereinafter, referred to as a "condition setting screen") for setting inspection conditions as illustrated in FIG. 9 is displayed on the display unit 241. A condition setting screen 900 includes three setting regions 901, 902, and 903 and an OK button 904.

The setting region 901 is a region for setting a defect detection level for when performing inspection. The user can operate a spin button in the setting region 901 to set a desired inspection level. Here, the higher the inspection level to be set (the larger the value), the smaller the difference between a correct image and an inspection image for the inspection image to be determined a defect image.

The setting region 902 is a region for setting inspection items (inspection categories). Depending on a purpose of inspection, the user can select one or more inspection items using a check box as to what to consider when performing inspection. In an example of FIG. 9, five items of position, tone, density, streak, and omission, are provided, and four items of position, tone, streak, and omission are checked. In this case, position, tone, streak, and omission are targets of inspection, but density is not a target of inspection.

The setting region 903 is a region for setting a threshold for stopping printing when a printing defect is found (i.e., when an NG determination is made in inspection processing) consecutively. This setting causes printing to be stopped when an NG determination is made consecutively for that number of times or more. Since subsequent sheets are being printed even during inspection, NG may occur consecutively up to the threshold or more. In addition, when the threshold is set to 0, it means to not stop printing even if an NG determination is made. Details of this threshold will be described later. When the OK button 904 is pressed, setting of inspection conditions is completed, and the display returns to the aforementioned inspection menu screen 400.

(Confirmation of Inspection Result)

Figure 10:
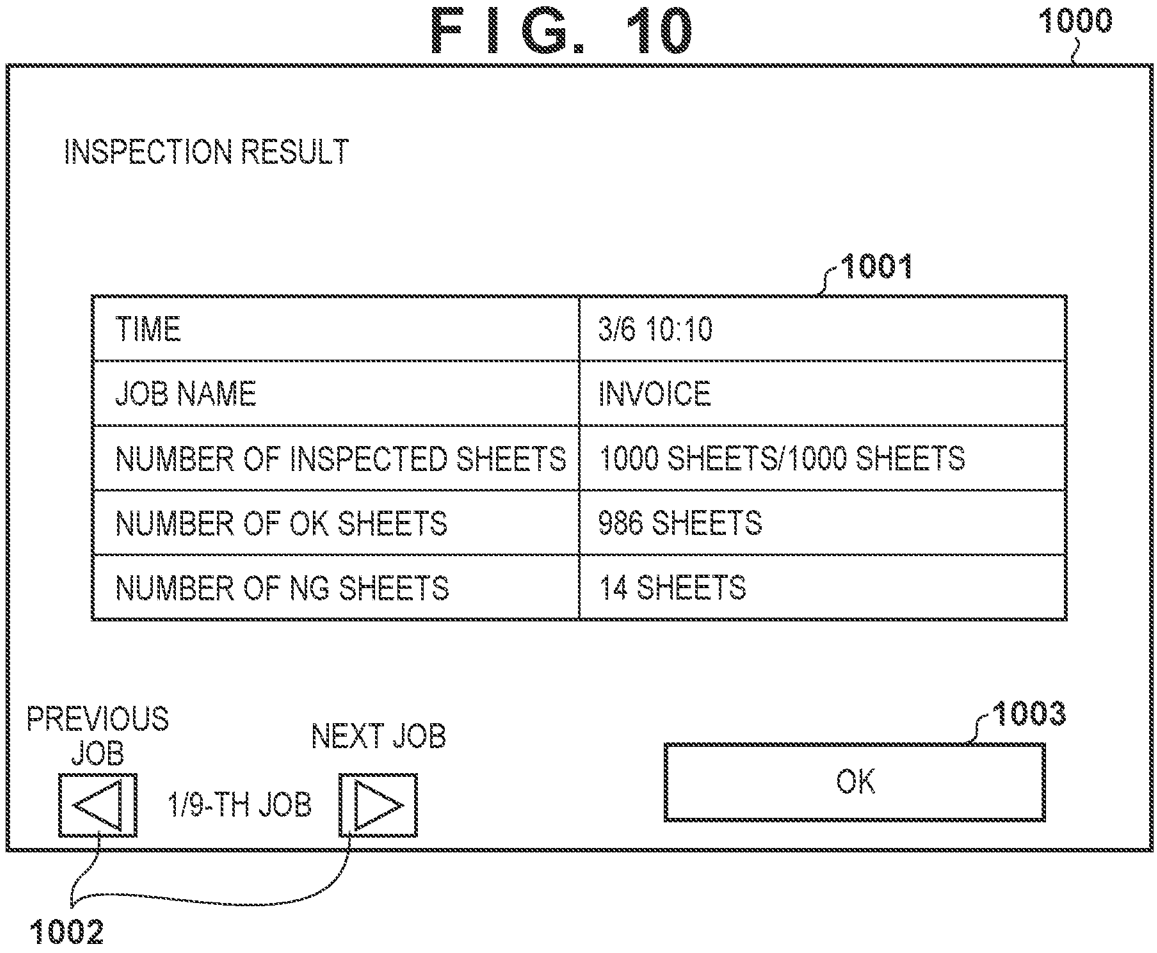
FIG. 10 is a diagram illustrating an example of a UI screen of the inspection module according to the embodiment.

When the user presses the button 405 in the aforementioned inspection menu screen 400, a UI screen (hereinafter, referred to as a "result confirmation screen") for confirming an inspection result as illustrated in FIG. 10 is displayed on the display unit 241. A result confirmation screen 1000 includes a result display region 1001 for displaying details of an inspection result, buttons 1002 for switching inspection jobs to be displayed, and an OK button 1003. In FIG. 10, in the result display region 1001, respective pieces of information—an inspection execution date and time, a name of a target inspection job, a number of sheets for which inspection has been executed, and a number of passing sheets and a number of failing sheets among the number of sheets for which inspection has been executed—are displayed for a first job out of nine inspection jobs for which history is stored. The user can change an inspection job to be displayed by operating the left and right spin buttons 1002. When the user who has confirmed an inspection result presses the OK button 1003, the display returns to the aforementioned inspection menu screen 400.

<Print Processing with Inspection>

Figure 11A:
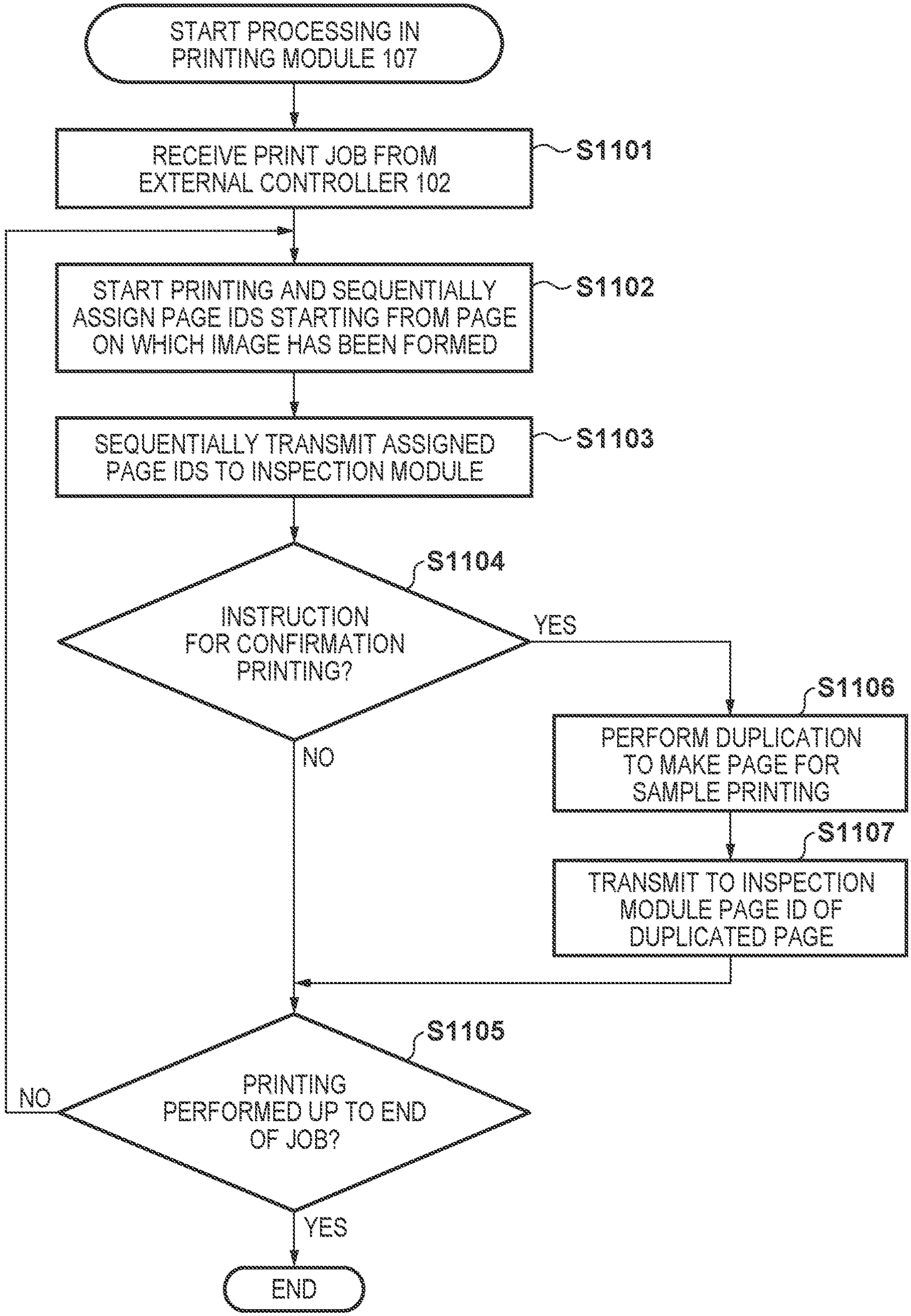
FIG. 11A is a processing flowchart for when executing confirmation printing during execution of inspection processing according to the embodiment.
Figure 11B:
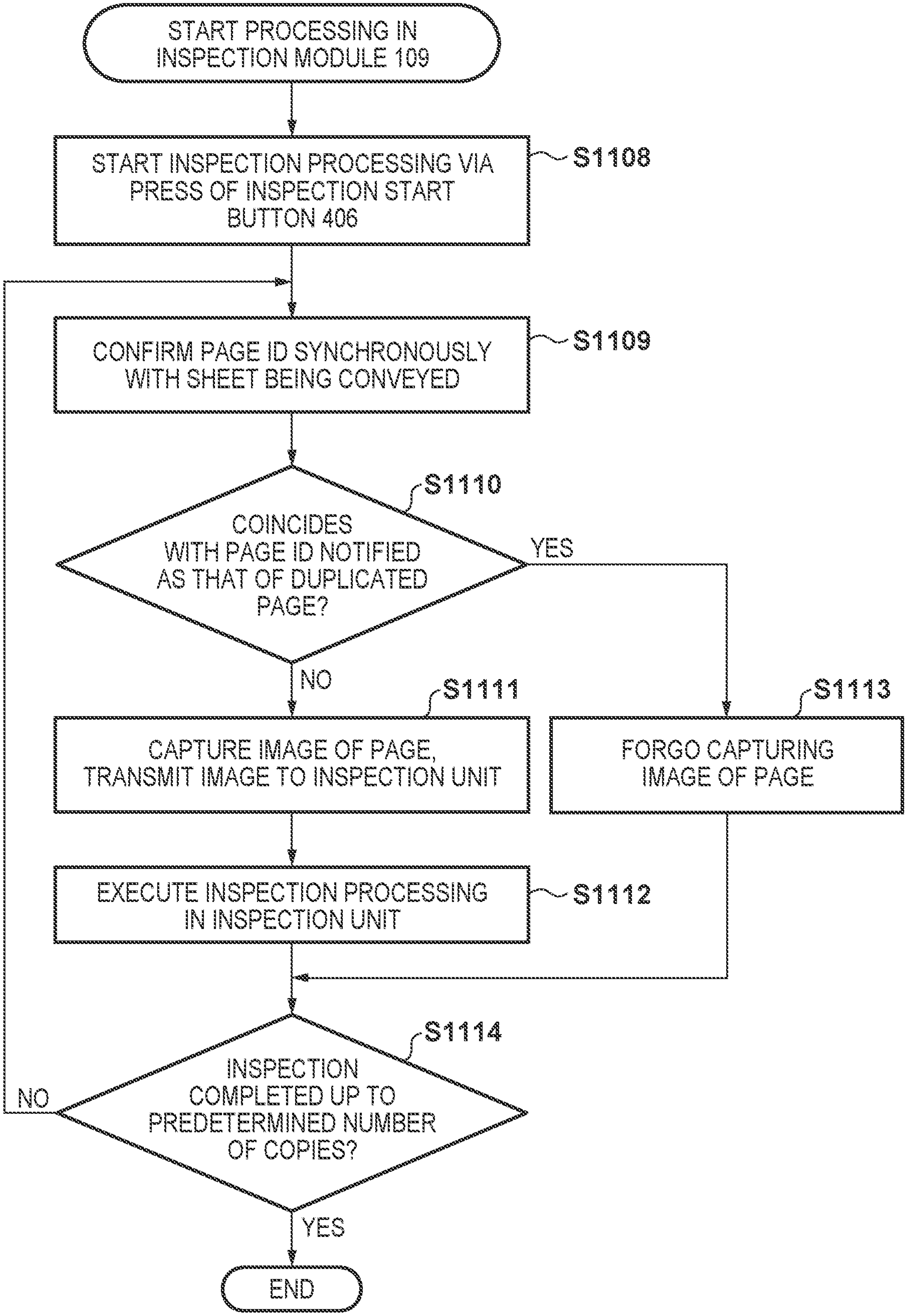
FIG. 11B is a processing flowchart for when executing confirmation printing during execution of inspection processing according to the embodiment.

Next, a flow of detailed processing for when performing print processing with inspection and a flow of processing for when an instruction for executing confirmation printing is received during print processing will be described with reference to FIG. 11A and FIG. 11B. FIG. 11A illustrates a processing flow of the printing module 107, and FIG. 11B illustrates a processing flow of the inspection module 109. Respective processes of the flowchart of FIG. 11A is realized, for example, by the CPU 222 reading and executing the control program stored in the memory 223 or the HDD 221. Meanwhile, respective processes of the flowchart of FIG. 11B is realized, for example, by the CPU 238 reading and executing the control program stored in the memory 239.

Here, confirmation printing is processing for executing printing for confirmation, such as confirmation of tone, of a printed material as an interruption function during inspection and discharging the printed material to the escape tray 346. For example, it is used when an operator or the like confirms whether there is a problem in a printed material during consecutive printing. Therefore, printing is performed by interrupting a print job currently being executed (an inspection job), and because the escape tray 346 is positioned downstream of the inspection module 109 in a conveyance path, the page order of the inspection job is shifted in the inspection module 109. However, according to the present embodiment, it is possible to accurately execute an inspection job without being affected by such a shift in the page order, and a description will be given in detail below.

First, the user presses the "start inspection" button 406 on the inspection menu screen 400 of the inspection module 109. Thus, in step S1108 of FIG. 11B, the inspection module 109 detects that an inspection start button has been pressed, and starts inspection processing.

Hereinafter, processing of the printing module of FIG. 11A will be described first. In step S1101, the printing module 107 receives a print job from the external controller 102 via the LAN I/F 218 and the video I/F 220. When the print job is received, in step S1102, the CPU 222 provided in the printing module 107 sequentially assigns page IDs starting from a page on which an image has been formed. That is, the assigning of page IDs here is performed sequentially, for an additional page inserted during inspection as well as a printed material according to the inspection job.

Next, in step S1103, the CPU 222 sequentially transmits the assigned page IDs to the inspection module 109 via the communication I/F 217 and the communication cable 254. Next, in step S1104, the CPU 222 determines whether an instruction for confirmation printing has been received via the operation unit 224. If it is determined that there is no instruction for confirmation printing, the processing proceeds to step S1105, and the CPU 222 determines whether printing has been completed up to the end of the job, and if printing has been completed up to the end of the job, the processing ends. Meanwhile, if it is determined that the job is still partway, the processing returns to step S1102, and control is continued.

If it is determined in step S1104 that there is a print instruction for confirmation printing, the processing proceeds to step S1106, and the CPU 222 interrupts printing in the inspection job that is currently being executed, performs duplication to make an additional page for a sample, and performs control so that the additional page is outputted to the escape tray 346. Here, the additional page for a sample is, for example, a duplicate of any of the pages included in the inspection job that is being executed. Also, as illustrated in FIG. 3, the escape tray 346 is provided in the stacker 110 disposed downstream of the inspection module 109 in a path in which a product from the printing module 107 is conveyed. That is, a sheet that has been duplicated for a sample passes through the inspection module 109 and is conveyed to the stacker 110 and then discharged to the escape tray 346. Therefore, in the inspection module 109, an additional sheet that has been duplicated for a sample is conveyed, inserted into an order of pages that was initially expected, and so a page order of a printed material according to the inspection job is shifted.

Next, in step S1107, the CPU 222 transmits a page ID of the duplicated additional page as additional information to the inspection module. Page ID information (additional information) of the duplicated additional page is notified to the image capturing unit 240 of the inspection module via the communication cable 254 and the system bus 256 at a timing at which an image is formed on that page. Therefore, the information is transmitted to the inspection module 109 certainly before an additional page (a sheet) duplicated for a sample is conveyed and reaches the inspection module 109. When processing for step S1107 is executed, the processing proceeds to step S1105, and if printing is completed to the end of the job, the processing ends. Meanwhile, if it is determined that the job is still partway, the processing returns to step S1102, and control is continued.

Next, processing of the inspection module 109 in FIG. 11B will be described. When inspection processing is started in step S1108, the image capturing unit 240 of the inspection module 109 starts processing in synchronization with when a sheet is conveyed. When the processing is started, in step S1109, the image capturing unit 240 confirms a page ID that has been transmitted in advance from the printing module 107 in synchronization with conveyance of the sheet. Further, in step S1110, the image capturing unit 240 confirms "page ID information (additional information) of a duplicated additional page" which is separately transmitted in advance from the printing module 107 and determines whether the page confirmed in step S1109 coincides with the duplicated additional page.

If it is determined in step S1110 that the page is not a duplicated additional page, the processing proceeds to step S1111, and the image capturing unit 240 captures an image of the page and transmits the image to the inspection unit 243. Next, in step S1112, the inspection unit 243 performs inspection processing on an image for inspection transmitted from the image capturing unit 240. The inspection processing detects abnormalities by comparing a correct image and an inspection image as mentioned above. Thereafter, in step S1114, the CPU 238 of the inspection module 109 determines whether inspection has been completed up to a predetermined number of sheets. If it is determined that inspection has been completed up to a predetermined page, the processing ends. Meanwhile, if it is determined that inspection has not yet been completed up to the predetermined number of sheets, the processing is returned to step S1109 and the processing continues.

Meanwhile, when it is determined in step S1110 that it is a duplicated additional page, the processing proceeds to step S1113; the image capturing unit 240 performs control so as to forgo capturing an image of the additional page, and the processing proceeds to step S1114. A description for processing for step S1114 and thereafter will be omitted as it is the same as described above.

As described above, according to the present embodiment, there is provided an in-line printing system including a printing apparatus and an inspection apparatus for inspecting a product outputted by the printing apparatus. The printing apparatus includes a printing module that performs printing in accordance with a page order of an inspection job and, when a predetermined interruption function is instructed during execution of the inspection job, inserts an additional page according to the predetermined interruption function into a printed material of the inspection job that is being executed. In addition, the printing apparatus sequentially assigns page information to each page of the product outputted by the printing module and assigns additional information indicating an additional page inserted by the printing module to sequentially notify the inspection apparatus of the page information and the additional information. In addition, the printing apparatus sequentially conveys the products including a printed material and an additional page to the inspection apparatus. The inspection apparatus receives the notified page information and additional information, compares the page information and the additional information, and performs inspection by comparing a printed material according to the inspection job excluding the additional page from the product based on a comparison result and pre-registered correct images corresponding to respective pages of the printed material. By this, according to the present embodiment, it becomes possible to appropriately identify a page that is not an inspection target and exclude it from an inspection target even when a page order of a document being inspected is shifted by a predetermined interruption function. Therefore, it becomes possible to appropriately use, in combination, inspection processing in a printing system incorporating an in-line inspection apparatus and the predetermined interruption function during inspection.

<Variation>

The present invention is not limited to the above embodiment and various variations are possible. In the aforementioned embodiment, an example in which in step S1113, control is performed so as to forgo capturing an image of an additional page has been described; however, control may be performed so as to capture an image of the additional page. In this case, control is performed so as not to transmit the captured image of the additional page to the inspection unit 243 or not inspect the additional page in the inspection unit 243. By also capturing the additional page in this way, it becomes possible to display on an operation screen or the like the captured image based on, for example, the user's instruction. Alternatively, the result confirmation screen 1000 for inspection results illustrated in FIG. 10 may include a captured image of an additional page.

In the aforementioned embodiment, a confirmation printout has been described as an example of an additional page; however, as described above, the present invention can be similarly applied to functions such as insertion of a divider sheet or slip sheet between copies, automatic output of a banner page, and forced discharge of a remaining index sheet. That is, the present invention can be effectively applied to a function in which another sheet is inserted between printed sheets during execution of an inspection job.

According to the present invention, it becomes possible to identify a page that is not an inspection target and exclude it from an inspection target even when a page order of a document being inspected is shifted by a predetermined interruption function and to use the predetermined interruption function and inspection processing in combination.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-159719, filed Sep. 29, 2021, which is hereby incorporated by reference herein in its entirety.

What is claimed is:

1. A printing system including a printing apparatus and an inspection apparatus configured to inspect a product outputted by the printing apparatus, the printing apparatus comprising:

one or more first processors connected to one or more first memories storing instructions that, when executed by the one or more first processors, cause the printing apparatus to:

perform printing in accordance with a page order of an inspection job and, in a case where a predetermined interruption function is instructed during execution of the inspection job, insert, in a printed material of the inspection job that is being executed, an additional page according to the predetermined interruption function;

sequentially assign page information to each outputted product, assign additional information indicating the additional inserted page, and sequentially notify the inspection apparatus of the page information and the additional information; and to sequentially convey to the inspection apparatus products including the printed material and the additional page; and the inspection apparatus comprising:

one or more second processors connected to one or more second memories storing instructions that, when executed by the one or more second processors, cause the inspection apparatus to:

receive the page information and the additional information;

compare the page information and the additional information;

obtain, based on a result of the comparison of the page information and the additional information, an image of another page obtained by excluding, from among the products conveyed from the printing apparatus, the additional page coinciding with the additional information; and perform inspection by comparing the obtained image and a pre-registered correct image corresponding to a respective page of the printed material.

2. The printing system according to claim 1, wherein the one or more second processors, cause the inspection apparatus to:

obtain images of the products conveyed from the printing apparatus; and perform inspection by comparing an image of another page obtained by excluding, from among the obtained images, an image of the additional page coinciding with the additional information, and the pre-registered correct image corresponding to a respective page.

3. The printing system according to claim 1, wherein in a case where confirmation printing has been instructed as the interruption function, the one or more first processors cause the printing apparatus to output, as the additional page, a duplicate of any page included in the inspection job that is being executed.

4. The printing system according to claim 1, wherein in a case where an addition of a divider sheet or a slip sheet has been instructed as the interruption function, the one or more first processors cause the printing apparatus to insert, as the additional page, a divider sheet or a slip sheet into the printed material according to the inspection job that is being executed.

5. The printing system according to claim 1, wherein in a case where an automatic output of a banner page has been instructed as the interruption function, the one or more first processors cause the printing apparatus to insert, as the additional page, a banner page into the printed material according to the inspection job that is being executed.

6. The printing system according to claim 1, wherein in a case where a discharge of a remaining index sheet has been instructed as the interruption function, the one or more first processors cause the printing apparatus to insert, as the additional page, a remaining index sheet into the printed material according to the inspection job that is being executed.

7. A method of controlling a printing system including a printing apparatus and an inspection apparatus configured to inspect a product outputted by the printing apparatus, the method comprising:

in the printing apparatus, performing printing in accordance with a page order of an inspection job and, in a case where a predetermined interruption function is instructed during execution of the inspection job, inserting, in a printed material of the inspection job that is being executed, an additional page according to the predetermined interruption function;

sequentially assigning page information to each product outputted in the printing, assigning additional information indicating the inserted additional page, and sequentially notifying the inspection apparatus of the page information and the additional information; and sequentially conveying to the inspection apparatus products including the printed material and the additional page, and in the inspection apparatus, receiving the notified page information and additional information;

comparing the page information and the additional information;

obtaining, based on a result of the comparing, an image of another page obtained by excluding, from among the products conveyed from the printing apparatus, the additional page coinciding with the additional information; and performing inspection by comparing the obtained image and a pre-registered correct image corresponding to a respective page of the printed material.

8. An inspection apparatus operable to inspect a product from a printing apparatus configured to perform printing in accordance with a page order of an inspection job, the inspection apparatus comprising:

one or more processors connected to one or more memories storing instructions that, when executed by the one or more processors, cause the inspection apparatus to:

receive page information assigned to each product outputted by the printing apparatus and, in a case where an additional page according to a predetermined interruption function has been added during execution of printing of the inspection job in the printing apparatus, additional information indicating that additional page;

compare the page information and the additional information;

obtain, based on a result of the comparison, an image of another page obtained by excluding, from among the products conveyed from the printing apparatus, the additional page coinciding with the additional information; and perform inspection by comparing the obtained image and a pre-registered correct image corresponding to a respective page of the printed material.

9. A method of controlling an inspection apparatus configured to inspect a product from a printing apparatus configured to perform printing in accordance with a page order of an inspection job, the method comprising:

receiving page information assigned to each product outputted by the printing apparatus and, in a case where an additional page according to a predetermined interruption function has been added during execution of printing of the inspection job in the printing apparatus, additional information indicating that additional page;

comparing the page information and the additional information;

obtaining, based on a result of the comparison, an image of another page obtained by excluding, from among the products conveyed from the printing apparatus, the additional page coinciding with the additional information; and performing inspection by comparing the obtained image and a pre-registered correct image corresponding to a respective page of the printed material.

10. A non-transitory computer-readable storage medium storing a computer program for causing a computer to execute each process in a method of controlling an inspection apparatus configured to inspect a product from a printing apparatus configured to perform printing in accordance with a page order of an inspection job, the method comprising:

receiving page information assigned to each product outputted by the printing apparatus and, in a case where an additional page according to a predetermined interruption function has been added during execution of printing of the inspection job in the printing apparatus, additional information indicating that additional page;

comparing the page information and the additional information;

obtaining, based on a result of the comparison, an image of another page obtained by excluding, from among the products conveyed from the printing apparatus, the additional page coinciding with the additional information; and performing inspection by comparing the obtained image and a pre-registered correct image corresponding to a respective page of the printed material.

* * * * *